US007478059B2

(12) United States Patent
Crocitto

(10) Patent No.: US 7,478,059 B2
(45) Date of Patent: Jan. 13, 2009

(54) SYSTEM AND METHOD FOR CONTENT DISTRIBUTION AND COMMERCE ON A PEER-TO-PEER NETWORK

(75) Inventor: Robert W. Crocitto, 5233 N. Elk River Rd., Reno, NV (US) 89511

(73) Assignee: Robert W. Crocitto, Reno, NV (US)

( * ) Notice: Subject to any disclaimer, the term of this patent is extended or adjusted under 35 U.S.C. 154(b) by 732 days.

(21) Appl. No.: 10/665,025

(22) Filed: Dec. 29, 2003

(65) Prior Publication Data

US 2005/0144080 A1      Jun. 30, 2005

(51) Int. Cl.
  *G06Q 30/00*      (2006.01)
(52) U.S. Cl. .......................... 705/26; 705/37
(58) Field of Classification Search .................. 705/26, 705/37
  See application file for complete search history.

(56) References Cited

U.S. PATENT DOCUMENTS

| 5,726,909 | A | | 3/1998 | Krikorian | |
|---|---|---|---|---|---|
| 5,892,900 | A | * | 4/1999 | Ginter et al. | 725/26 |
| 5,918,213 | A | | 6/1999 | Bernard et al. | |
| 2001/0051996 | A1 | * | 12/2001 | Cooper et al. | 709/217 |
| 2002/0178255 | A1 | * | 11/2002 | Hobart | 709/224 |
| 2004/0153528 | A1 | * | 8/2004 | Suzuki | 709/219 |
| 2004/0260652 | A1 | * | 12/2004 | Rose | 705/51 |

OTHER PUBLICATIONS

When creators, corporations and consumers collide: Napster and the development of on-line music distribution, Tom McCourt, Patrick Burkart. Media, Culture & Society. London: May 2003. vol. 25, Iss. 3; p. 333, downloaded from ProQuest Direct on the Internet on Sep. 9, 2008, 2 pages.*

Peer-to-peer, Wikipedia on the Internet, downloaded on Sep. 9, 2008, 12 pages.*
"Music trading heads back underground" by John Borland, Staff Writer, CNET News.com May 8, 2001, available at http://news.cnet.com/news/0-1005-200-5862906.html.

* cited by examiner

*Primary Examiner*—James Zurita

(57) ABSTRACT

A computer based system for collecting royalties from content distribution on a peer-to-peer network is disclosed, comprising a content distribution server, transaction server and client computers operatively connected to a network. In an exemplary embodiment, a plurality of data files is preloaded onto the distribution server from a content publisher. By way of example and not limitation, a purchase request is submitted by clients prior to the release of the content. On the initial distribution of content to the public a single client is chosen from the group of clients that have submitted a purchase request. A distribution drawing is conducted by the transaction server to select a single client to download a single copy (the seed replica) from the distribution server. After the client is chosen the download is initiated, the transaction server records the transaction and the clients account is debited. The process is then repeated but in this stage the client replaces the distribution server and becomes the new distribution point. As the content is distributed multiple purchasing clients are now directed to the growing number of distributing clients till all content purchase requests are fulfilled. When content is transferred a points system is implemented by the transaction server. The transaction server issues a point to the purchasing client as well as a point to the distribution client for every transaction. As points accumulate clients can trade points in for cash, exchange points with other users or accumulate points. When a client accumulates points they have a greater chance of winning distribution lotteries since these points are taken into consideration by the transaction server when the distribution lotteries are conducted.

20 Claims, 2 Drawing Sheets

SYSTEM AND METHOD FOR CONTENT DISTRIBUTION AND COMMERCE ON A PEER-TO-PEER NETWORK

BACKGROUND OF THE INVENTION

1. Field of the Invention

The present invention relates to the field of data file distribution on a peer-to-peer network. More specifically, the present invention, in an exemplary embodiment, relates to a system and method of distribution of data files and collecting royalties upon the transfer of said data files in a peer-to-peer network environment.

2. Description of the Related Art

Over the years, numerous artists and musicians have recorded great volumes of work. Numerous record companies have thousands of recordings which are sold by standard means such as: at stores, online or through auctions. As used herein, "content" is understood to be equivalent and comprise works subject to copyright including audiovisual works such as music, performance, film, and video; still art such as paintings; print such as text; software such as video games or other executable software; and the like. It is thus understood that, as used herein in a exemplary manner, neither "recordings" nor "content" are limited to sound recordings such as music.

The prior art has addressed delivery of content over a network such as the Internet. U.S. Pat. No. 5,726,909 to Krikorian for "CONTINUOUS PLAY BACKGROUND MUSIC SYSTEM" is illustrative. A central computer has access to a master song library, among other data files, and provides end users with access to the music from the song library. End users have appropriate equipment to render the data file into a perceptible output and can selectively customize the content to be delivered.

U.S. Pat. No. 5,918,213 issued to Bernard et al. for "SYSTEM AND METHOD FOR AUTOMATED REMOTE PREVIEWING AND PURCHASING OF MUSIC, VIDEO, SOFTWARE, AND OTHER MULTIMEDIA PRODUCTS" is further illustrative. Users of this system can make purchases via a remote communications medium without human intervention by the publisher of the work being accessed.

Neither of these prior art references discloses, suggests, or provides motivation for using a peer-to-peer network to store the data files as well as provide a means to distribute content and commissions to the client.

Peer-to-peer sharing, as exemplified by KaZaa and Grogster, made many people aware of the power, flexibility, economics, and desirability of peer-to-peer services. See, e.g., "Music trading heads back underground" by John Borland, Staff Writer, CNET News.com May 8, 2001, available at http://news.cnet.com/news/0-1005-200-5862906.html. Some recordings may have been made available through peer-to-peer networks but such availability has often skirted the law, especially copyright law, depriving artists and their publishers such as record company's revenue they would have received if the recordings had been purchased.

Even after copyright based litigation, peer-to-peer services still draw tens of thousands of users each day. In part, these users are drawn to large numbers of recording data files still available for free.

Problems with the peer-to-peer applications of the prior art remain, including guaranteeing the consumer that they are getting a authentic recording and royalties, i.e. insuring remuneration paid to the artist in an appropriate fashion.

A need therefore exists for placing recordings online and making content available in a manner that allows consumers to retrieve and purchase copies of the content and yet provide the consumer with a incentive for accessing these works via legitimate means other than a standard peer-to-peer network that is prone to piracy and copyright infringements.

BRIEF DESCRIPTION OF THE DRAWINGS

These and other features, aspects, and advantages of the present invention will become more fully apparent from the following description, appended claims, and accompanying drawings in which:

REFERENCE NUMBERS IN DRAWING

| | |
|---|---|
| 14 high speed data communications vice | 21 computer |
| 22 computer | 40 local area network |
| 49 transaction Server | 50 content distribution network |
| 52 distribution server | 54 data communications interface |
| 56 controller | 60 software (not shown) |
| 100 internet | |

BRIEF SUMMARY OF THE INVENTION

In an exemplary embodiment, among other advantages, the present invention provide an ability to guarantee the authenticity of recordings that are distributed by digitally signing the recordings, as well as, tracking the distribution within the peer-to-peer network The present inventions further provide for a commission system that is used to compensate consumers when they distribute recordings within the peer-to-peer network while collecting royalties due the data creators and their publishers.

In an exemplary embodiment, the present inventions are comprised of a system for access to a collection of data across a peer-to-peer data network. The system may comprise a transaction server operatively connected to a persistent data store containing a record of every transaction corresponding with a recording purchase placed by a consumer; a data communication interface, operatively connected to the computer to effect a peer-to-peer network; and software, executing in the computer, that is capable of identifying other systems executing instances the software, allowing peer-to-peer sharing of the data files after being digitally authenticated by the transaction server or server cluster connected to the content distribution network.

The scope of protection is not limited by the summary of an exemplary embodiment set out above, but is only limited by the claims.

DETAILED DESCRIPTION OF THE PREFERRED EMBODIMENT

By way of example and not limitation, many music companies have thousands of song recordings currently being sold online through a group of online music services, e.g. Apple itunes, listen.com, AOL musicnet and buymusic.com. Film companies also have hundreds of films which could be distributed in such a manner but currently do not have widespread service due to internet bandwidth constraints.

Figure 1:
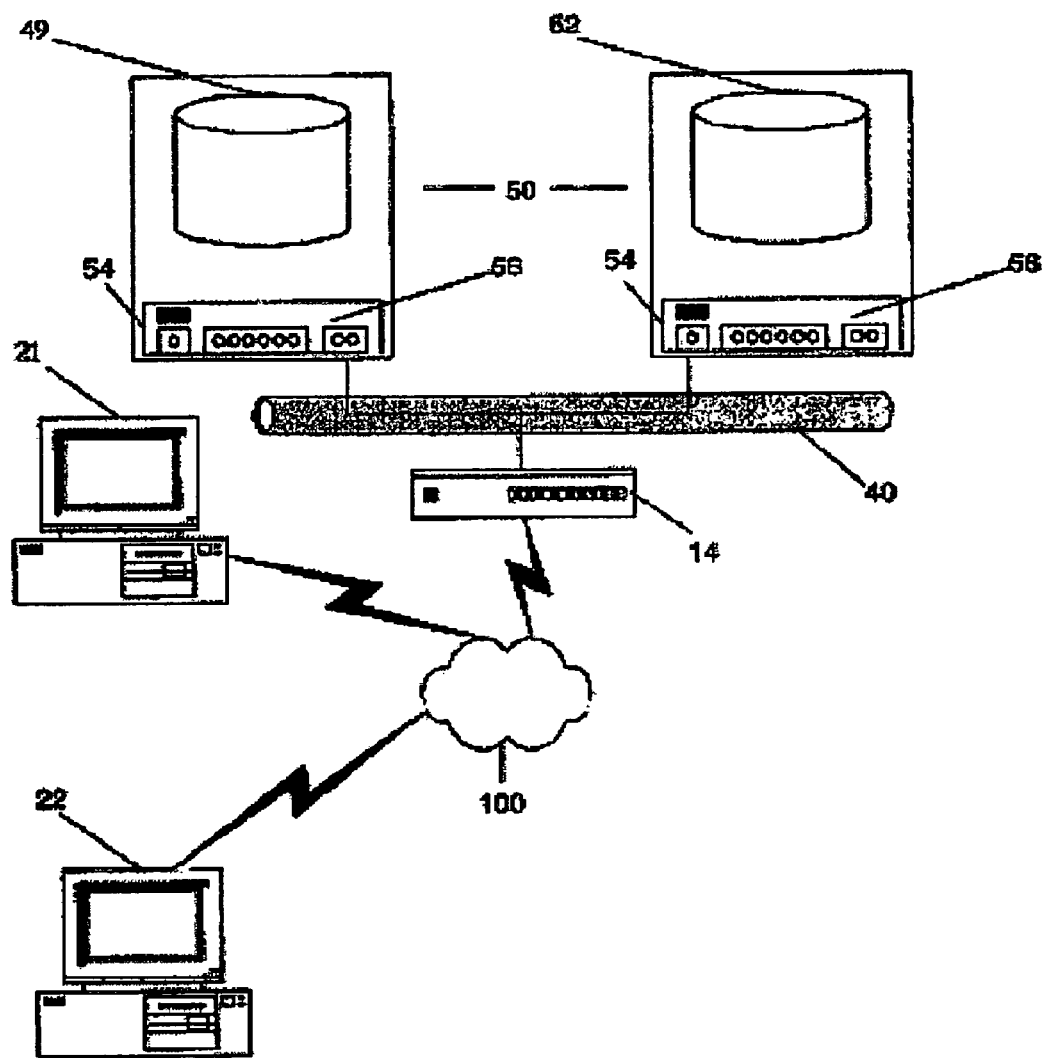
FIG. 1 is a schematic view of an content distribution network layout.

Referring now to FIG. 1, a schematic view of an exemplary system layout, in a preferred embodiment the Content Distribution System 50 is comprised of Transaction Server 49 and a Distribution Server 52 both equipped with a data communications interface 54. Transaction Server is referred to generally herein as "49", the Distribution Server referred to as "52" and the Content Distribution System to as "50". Content Distribution System 50 may comprise a Transaction Server 49 and Distribution Server 52 combined in one computing device to service a small user base or the services of 49 and 50 can be performed by many computing devices or a cluster of computing devices to service a large client base. In the preferred embodiment requisite software 60 (not shown in the Figures) would be installed on one or more personal computers such as computer 21 or computer 22 to access the services performed by 50. If the servers are dispersed geographically the Transaction Server 49 and Distribution Server 52 may incorporate a separate, virtual network between the servers "49" and "52" to facilitate a secure passage of communications.

The Distribution Server 52 may contain several tens if not hundreds of data files, including data files comprising content, by way of example and not limitation including high quality digital reproductions of music recordings, MP3 recordings, audiovisual recordings such as film, and the like, or combinations thereof. In a preferred embodiment, each data file resident on the Distribution Server 52 may be secured such as with a secure data format such as AAC or other secure data formats. Additional levels of security may exist as well, such as security levels associated with each and Distribution Server 52, with one or more folders on and Distribution Server 52 containing data files, or the like, or a combination thereof.

In the currently preferred embodiment, and Distribution Server 52 comprises a hard disk device, in a preferred embodiment having around hundreds of gigabytes or more of data storage and Distribution Server 52 is capable of containing around ten thousand or more high quality digital audio tracks. In other currently envisioned embodiments, Distribution Server 52 may comprise any suitable large data storage device, by way of example and not limitation comprising electronic storage media, optical media such as CDROM or DVDROM, writable media optical media such as CD-R, CD-RW, and DVD-RAM, removable media, multiple media such as RAID hard disk device arrays, and the like, or combinations thereof.

In a preferred embodiment, data files may be stored using a secure format such as a DRM data structure or blanket. In this manner, if Distribution Server 52 is removed from Content Distribution System 50 and accessed within a personal computer environment, data on data store cannot be retrieved and processed into its preferred perceptible format with out receiving a transaction confirmation from Transaction Server 49. Additionally, data files may be stored using a database structure that comprises audio and meta-data such as lyrics, album data background information of the artists, and the like, or combinations thereof.

In the current preferred embodiment, the transaction server 49 comprises a hard disk device containing a database to record transactions executed by the client software 60, the transaction server will provide account login, authentication and content purchase records when needed to cross-reference them in process called the distribution drawing. The distribution drawing is a process performed by the transaction server to determine which client the content will be downloaded from in the distribution process; this process will be described more in depth described later in this document.

As will be understood by those of ordinary skill in the computer arts, data communications interface 54 may comprise a local area network adapter (not shown in the figures) such as for connection to local area network 40 or a high speed data communications device 14 or access to a high speed data communications device 14 such as a DSL router, a data communication adapter such as a DSL Internet interface, modems, serial ports, parallel ports, USB ports, FIREWIRE™ ports, or the like, or combinations thereof. A peer-to-peer network may be accomplished by access to a data network such as the Internet 100.

Transaction Server 49 and Distribution Server 52 may further comprise a controller 56 such as a central processing unit, memory, and operational software including software 60 to effect the present invention's peer-to-peer access. In alternative embodiments, controller 56 may comprise one or more application specific integrated circuits in conjunction with or in place of the central processing unit.

Software 60 may have several components with differing capabilities. Software 60 is capable of interfacing with Content Distribution System 50, including computers 21, 22 executing instances of software 60, and identify Transaction server 59 as a host and Distribution Server 52 as a peer, e.g. software 60 executing in Transaction server and Distribution Server 52 might identify computer 22 as a peer but not computer 21 if computer 21 was not executing software 60.

In a currently preferred embodiment, Transaction Server 49 exists to provide registration, authentication, transaction tracking and other services. Catalogs of data and their content will be managed by the Distribution Server 52. As Distribution Server 52 distributes content to the content distribution network, data becomes available almost immediately for the peer community, e.g. Distribution Server 52 may publish to peers 21 and 22 to announce when new content is available.

Figure 2:
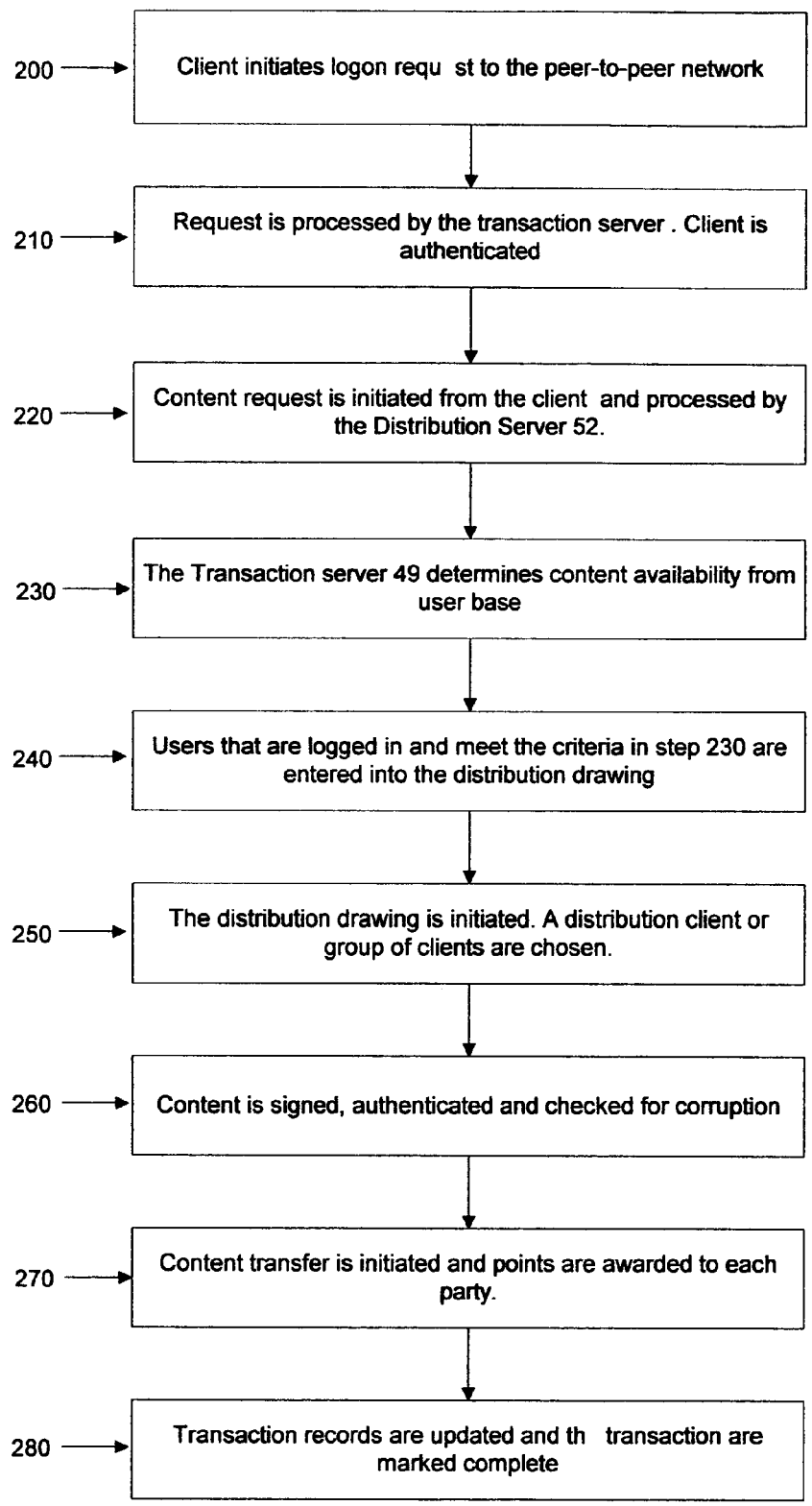
FIG. 2 is a flowchart of an exemplary embodiment of the content distribution network.

In the operation of an exemplary embodiment, referring now to FIG. 2, a flowchart of an exemplary embodiment, each Distribution Server 52 is preloaded 200 with a set of data files from a larger set of data files such as at a publisher site. The preloading may be in a predetermined or random sequence. In the preferred embodiment, overlap exists between a plurality of Distribution Server 52 with respect to at least a portion of their data files. In this way, redundancy and availability may be enhanced by substituting the Distribution Server 52 with a server array or cluster.

In the preferred embodiment the transaction server 49 will be populated with client account information from existing subscribers and will also contain within the database structure transactions records of every purchase/exchange of published content that occurred within the content distribution network.

In 200 the client initiates the logon process, such as through a logon procedure, using techniques which will be readily familiar to those of ordinary skill in the software arts from Workstation 21 or 22 using the content exchange network client software 60 loaded on the workstation. The authentication information is then passed to the transaction server over a secure channel. If the logon information is valid the client is then authenticated 210 and allowed to begin using the content exchange network.

In a currently preferred embodiment, once the Transaction Server 49 has authenticated the client they can then request content 220 from the Distribution Server 52. The content request would then be submitted as a query to the Distribution Server 52. The Distribution server would then generate a list of available content based on the content request. If the content has yet to be released to the public, prior to the contents release clients would place a preorder request before it is made available. In the case of prerelease orders, when the content is issued for public release a single seed replica is then made available for download from the Distribution Server 52. The seed replica is the first copy released into the content exchange network. The moment the content is released for public sale one client is chosen to receive the seed replica from the Distribution Server 52. This is done by conducting a distribution drawing using a points system described later in this document. After the client receives the seed replica the transaction is logged and the client is then charged for the content. The next transactions for the newly distributed content are then processed by the transaction server for the next group of clients, as in the first step the clients in the subsequent groups are chosen using a distribution drawing but in this stage the transaction server directs the download to take place from the client that received the original seed replica.

After content has already been made available to the public the Transaction Server 49 determines content availability by querying the transaction records of existing clients 230. From this query a list is generated of possible candidates for the distribution drawing that will take place to determine from which peer or peers the content is transferred from. If the user is logged into the content distribution network and holds a copy of the content requested they are entered into the distribution drawing 240. The distribution drawing is conducted in the following matter:

1. By way of example and not limitation, we will refer to the purchasing client as client A and the distributing client that already purchased the content as client B. When client A purchases content they are then awarded with 1 point, client B, the client that holds the copy of the content that client A has purchased is also awarded 1 point when they are chosen by the transaction server to be the distribution point for the content. The client then accumulates points with every transaction not only when they purchase content but when someone places an order for content and that order is fulfilled by them. Points are used in several ways:

a) Distribution Drawing Points: Points are used to determine who will download what content from whom. For example Client A has 4 points, Client B has 2 and Client C has 1, these will be our distribution clients. Client D will be our purchasing client. Client D places a purchase request. The transaction server 52 then determines that Clients A, B and C has the requested content. In this example clients A, B and C will receive 1 entry for every point they have. These entries would be similar to a piece of paper throw into a virtual hat for a drawing, these entries are then randomly mixed. The transaction server then pulls a single piece of paper from the hat. The Client that owns the chosen entry is then awarded with the download. When someone requests to purchase the same content the process begins again only this time Client D is added to the pool of distributing clients. A few restrictions would also be in place to provide first time clients a fair shot at being chosen for distribution as well as not allowing any single client to accumulate a massive amount of points and take enormous shares of content distribution away from less frequent users. The restrictions are as follows:

Points entry limit: The total some of points that can be placed into the drawing cannot exceed the sum of the points of the remaining users. In the example above user A could only contribute 3 of his/her 4 points into the pool since the sum of points of the remaining clients in the drawing (clients B and C) would total 3 points. This would cap the maximum percentage chance of winning a distribution drawing at 50%

Client download limit: Once a distribution client reached a limit (i.e 3 maximum) of purchasing clients downloading content from their library they are then removed from any distribution lotteries until a purchasing client completes their download.

Points Bonus: Bonus points could be awarded for first time clients.

Points Expiration: Points could be set to expire after a certain amount of time

Points for fractional Downloads: In cases where users with higher bandwidth links are downloading from a pool of users with lower speed connections the client software will request additional users from the distribution drawing to adequately compensate the download speed of the high-speed line of the purchasing client. Distribution clients will be chosen based on: current load, purchasing clients they are already servicing, total available upload bandwidth. They will be chosen in the order that they placed in the distribution drawing (i.e. 1st,2nd,3rd etc.). If multiple users are used to service a single purchasing client then the point(s) will be divided amongst the distribution client based on the percentage of the content they provided to the purchasing client (i.e. if 26% of the content was downloaded from their system they would receive 0.26 points).

Points Awarded: Depending on the value of the content multiple points can be awarded to clients when they participate in a transaction. For instance when a client distributes a movie or a audio book they could receive more points for the distribution since the content has a higher value than a single song.

Points Value: Points will always be given a minimum fixed dollar value that can be converted to cash at anytime by the Content Distribution network provider and paid to the client via check or credited to their account. A good example would be $0.20 for every point.

Points trade: Points can be bought and sold within the Content Distribution network by clients. These transactions could be tariffed by the Content Distribution network similar to sales tax collection on a standard transaction and this could provide an addition source of income. Online retailers could also be recruited to accept the points as payments for goods and services thus increasing the value and liquidity.

Additionally, by way of example and not limitation, utilizing the content distribution network the costumer would be inclined to accumulate points rather then spend them since it gives them more leverage in the distribution drawing, also consumers would also be more likely to purchase content from a Artist based on there popularity then just buying works he or she admired. Since the consumer also acts as the distributor they would be interested in building a broad collection of works to accumulate more points when purchasing clients download content from their library.

Returning to the operation of an exemplary embodiment in FIG. 2 the Transaction Server 49 receives the content request and initiates the distribution drawing. After the drawing is completed and a distribution client or a group of distribution clients are chosen 250 content is then made available for download.

In a currently envisioned embodiment, Distribution Server 52 would then digitally sign and verify all the content 260 prior to download initiation 270. Once the Distribution Server 52 receives the list of distribution clients determined by the outcome of the Distribution drawing it would then send an authentication request packet to the client requisite software 60 which would then use a algorithm to determine content authenticity 260. Only after the content is verified would it be transferred to the purchasing client 270. After the download is complete points would then be awarded to the participating clients 270 by the Transaction Server 49. The Transaction Server 49 would then update the transaction records and mark the transaction completed 280. If content is deemed to be tainted a message indicating the problem will be sent from the Distribution Server 52 to the client software 60 of the client distributing the flawed content, The client would then be removed from the distribution drawing for that particular piece of content until the client corrected the problem. The client would then be given the option to redownload the original content at no charge from the distribution server to correct the problem.

Additionally, by way of example and not limitation, unlike a typical peer-to-peer network clients would not be allowed to upload content to the network. Clients would be restricted to only being allowed to distribute content that they purchased through the network thus eliminating the possibility of a client uploading counterfeit content to the network. Since the transaction server has a record of every transaction, a clients purchase history could be crosschecked with their account to verify only content they purchased can be redistributed.

In further contemplated embodiments, clients that purchased content could be allowed to make digital copies of the content they purchased (i.e. Recordable CD's, MP3 player transfer, Recordable DVD's). Since the consumer has a stake in the distribution process they would be more likely to not give away pirated content to others using recordable media.

It will be understood that various changes in the details, materials, and arrangements of the parts which have been described and illustrated above in order to explain the nature of this invention may be made by those skilled in the art without departing from the principle and scope of the invention as recited in the following claims.

The invention claimed is:

1. A method of distributing content over a communications network, the method comprising the steps of:
   A. maintaining content on a user content downloading system in communication with the communications network;
   B. in response to receiving a first request for first content from a first user, downloading the first content to a first remote content storage system through the communications network;
   C. in response to receiving a second request for the first content from a second user, downloading the first content to a second remote content storage through the communications network;
   D. in response to receiving a third request for said first content from a third user, conducting a distribution lottery to select a distribution client from a pool of distribution clients comprised of at least the first user and the second user for downloading of the first content to a third remote content storage system; and
   E. providing a first award of points to the selected distribution client.

2. The method of distributing content of claim 1 also including the step of:
   F. in response to receiving the second request for said first content from the second user, providing a second award of points to the first user.

3. The method of distributing content of claim 1 wherein the first remote content storage system is the first user's content storage system.

4. The method of distributing content of claim 1 also including the step of:
   F. in response to receiving the third request for said first content, downloading the first content from the first remote content storage system to the third remote storage system through the communications network.

5. The method of distributing content of claim 1 also including the step of:
   F. providing a third award of points to the first user.

6. The method of distributing content of claim 1, wherein the first content is downloaded to the second remote content storage from a distribution server.

7. The method of distributing content of claim 1, wherein the first content is downloaded to the second remote content storage from the first remote content storage system.

8. The method of distributing content of claim 1, wherein the pool of distribution clients consists of users that are currently logged in.

9. The method of distributing content of claim 1, wherein each distribution client of the pool of distribution receives entries based at least in part on available bandwidth of the communications network.

10. The method of distributing content of claim 1, wherein the distribution lottery is based at least in part on the number of points accumulated by each distribution client of the pool of distribution clients.

11. The method of distributing content of claim 10, wherein each distribution client of the pool of distribution receives entries not exceeding the number of points accumulated by any other distribution client of the pool of distribution.

12. A method of distributing content over a communications network, the method comprising the steps of:
   A. maintaining content on a user content downloading system in communication with the communications network;
   B. receiving a first prerelease request for first content from a first user;
   C. receiving a second prerelease request for the first content from a second user;
   D. conducting a distribution lottery to select a seed client from a pool of distribution clients comprised of at least the first user and the second user for downloading of the first content to a first remote content storage system; and
   E. downloading the first content to the first remote content storage system through the communications network.

13. The method of distributing content of claim 12, also including the step of:
   F. providing an award of points to the selected seed client.

14. The method of distributing content of claim 12, wherein the pool of distribution clients consists of users that are currently logged in.

15. The method of distributing content of claim 12, wherein the distribution lottery is based at least in part on the number of points accumulated by each distribution client of the pool of distribution clients.

16. The method of distributing content of claim 15, wherein each distribution client of the pool of distribution receives entries not exceeding the number of points accumulated by any other distribution client of the pool of distribution.

17. A computer based content delivery system, the system comprising:
   A. one or more distribution servers connected to a communications network for maintaining content, receiving requests for content from a plurality of users, and downloading content to a plurality of remote content storage systems through the communications network; and B. one or more transaction servers connected to the communications network for conducting distribution lotteries to select distribution clients for downloading content from a pool of distribution clients comprised of at least one or more of the plurality of users, and providing awards of points to said selected distribution clients.

18. The computer based content delivery system of claim 17, wherein the pool of distribution clients consists of users that are currently logged in.

19. The computer based content delivery system of claim 17, wherein a distribution lottery is based at least in part on the number of points accumulated by each distribution client of the pool of distribution clients.

20. The computer based content delivery system of claim 19, wherein each distribution client of the pool of distribution receives entries not exceeding the number of points accumulated by any other distribution client of the pool of distribution.

* * * * *